United States Patent Office 3,707,559
Patented Dec. 26, 1972

3,707,559
N-ACYL PHENYLALANINE AMIDES
Robert H. Mazur, Deerfield, and David A. Jones, Jr., Skokie, Ill., assignors to G. D. Searle & Co., Chicago, Ill.
No Drawing. Filed May 14, 1971, Ser. No. 143,600
Int. Cl. C07c 103/30
U.S. Cl. 260—558 A          8 Claims

ABSTRACT OF THE DISCLOSURE

The above-captioned compounds are useful as pharmacological, e.g. anti-inflammatory, agents. They are manufactured by acylating phenylalanine to produce the N-acyl derivatives, then reacting the latter intermediates successively with an alkyl chloroformate and a primary amine to yield the desired N-acyl phenylalanine amides.

---

This invention is concerned generally with phenylalanine derivatives, and in particular, it is concerned with novel N-acyl phenylalanine amides of the following structural formula

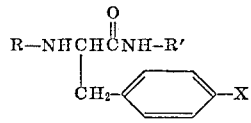

wherein R is a lower alkanoyl, hydroxy(lower alkanoyl) or acetoxy(lower)alkanoyl radical, R' is a phenylalkyl radical, trans-2-phenylcyclopropyl radical or a radical of the formula

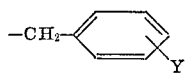

wherein Y is a hydrogen, lower alkoxy, hydroxymethyl, carboxy or lower alkyl radical and X is a hydrogen, halogen or lower alkoxy radical with the provision that when X and Y are hydrogen, the lower alkanoyl radical represented by R contains more than two carbon atoms.

The lower alkanoyl radicals represented by the above formula are formyl, acetyl, propionyl, butyryl, valeryl, caproyl, heptanoyl and the branched-chain isomers thereof. The lower alkyl radicals represented are methyl, ethyl, propyl, butyl, pentyl, hexyl, heptyl and their branched-chain isomers. The lower alkoxy radicals intended contain from 1–7 carbon atoms and are illustrated by methoxy, ethoxy, propoxy, butoxy and their branched-chain isomers.

Chlorine, bromine, iodine, and fluorine are illustrative of the halogen substituents intended. The phenylalkyl radicals represented by the above formula are phenethyl, phenylpropyl, phenylbutyl, phenylpentyl, phenylhexyl, phenylheptyl and the corresponding branched-chain isomers.

The instant compounds of this invention are prepared by acylating phenylalanine, p-alkoxyphenylalanine or a halogen substituted phenylalanine with an acid anhydride or an acid chloride to produce the N-acyl phenylalanine derivative. Typically, the reaction is run under basic conditions and then the pH is adjusted to provide an acidic environment from which the desired N-acyl phenylalanine derivative separates. For example, when DL phenylalanine is allowed to react with propionic anhydride at a pH of about 12 and the resulting solution is acidified with hydrochloric acid to a pH of about 1, DL N-propionylphenylalanine is obtained as the product. The N-acyl derivative is allowed to react successively with N-methylmorpholine and an alkyl chloroformate at a temperature of about —20° C., then with a primary amine to yield the desired N-acyl phenylalanine amide. As an illustration of this latter reaction, DL N-propionylphenylalanine 4-methylbenzylamide is produced when DL N-propionylphenylalanine is treated with N-methylmorpholine, ethyl chloroformate and 4-methylbenzylamine.

Basic conditions are conveniently maintained by the addition of aqueous sodium hydroxide and acidic conditions are maintained by the addition of hydrochloric acid. Preferred alkyl chloroformates are ethyl chloroformate and isobutyl chloroformate. D, L and DL phenylalanines or their appropriately substituted derivatives are selectively used as the starting materials to produce the desired D, L and DL products, respectively.

The acetoxy substituted N-acylphenylalanine amides are prepared from the appropriate phenylalanine amide and an acetoxy substituted acid chloride. Typically, DL phenylalanine 4-methylbenzylamide is allowed to react with acetoxyacetyl chloride, thus producing DL N-acetoxyacetylphenylalanine 4-methylbenzylamide. The acetoxy compounds so produced may be hydrolyzed with lithium hydroxide to yield the corresponding hydroxy compounds. For example, contacting DL N-acetoxyacetylphenylalanine 4-methylbenzylamide with lithium hydroxide affords DL N-hydroxyacetylphenylalanine 4-methylbenzylamide.

The instant compounds are valuable pharmacological agents. For example, they possess potent anti-inflammatory activity. That activity is determined by the following assay:

Intact, male Sprague-Dawley rats, weighing 170–200 g., are randomized into groups of 12 and treatment with compound is begun. Compounds suspended in saline containing a few drops of Polysorbate 80, are administered subcutaneously or intragastrically, and a like vehicle-treated control group is run simultaneously. After 1 day of compound administration, the animals are injected intradermally on the base of the tail with 0.6 mg. of dry, heat killed Mycobacterium butyricum suspended in 0.05 ml. of paraffin oil. Compound administration is continued daily for an additional 19 consecutive days with the control group being administered vehicle alone. The rats are sacrificed on the 20th day and the degree of swelling in the hind paws is determined by a volume displacement apparatus or by ankle circumference measurement. Each treated group is compared statistically with the control group and the compound is rated active if it causes a significant reduction in swelling ($P<0.05$) as compared to the controls (Wilcoxon rank-sum).

The instant compounds further possess the ability to inhibit the edema induced in rats by the injection of carrageenin and the ability to inhibit formation of granuloma tissue induced in adrenalectomized rats via implanted cotton as shown by assays described in U.S. Pat. 3,528,966.

The invention will appear more fully from the examples which follow. Since many variations in materials and methods will be apparent to one skilled in the art, these examples are not to be construed as limiting the invention either in spirit or in scope. In the following examples, quantities of material are expressed in parts by weight unless otherwise specified and temperatures are presented in degrees centigrade (° C.).

EXAMPLE 1

The pH of a suspension of 16.5 parts of DL phenylalanine with 100 parts of water is adjusted to approximately 12.5 by the addition of 50% aqueous sodium hydroxide with stirring and cooling at about 10°. To that alkaline mixture is then added, over a period of about 1 hour, while maintaining the temperature below 15°, 39 parts of propionic anhydride while the pH is kept between 12.2 and 12.8 by the periodic addition of 50% aqueous sodium hydroxide. That reaction mixture is then stirred for about 2 hours at room temperature, at the end of which time the pH is adjusted to approximately 1 by the addition of concentrated hydrochloric acid. The crude product which precipitates is collected by filtration, washed on the filter with water and dried to afford DL N-propionylphenylalanine, melting at about 132–133.5°.

EXAMPLE 2

By substituting an equivalent quantity of acetic anhydried in the procedure of Example 1, DL N-acetylphenylalanine, melting at about 140–142°, is produced.

EXAMPLE 3

When an equivalent quantity of butyric anhydride is substituted in the procedure of Example 1 there is obtained DL N-butyrylphenylalanine, melting at about 95–98°.

EXAMPLE 4

16.5 parts of DL phenylalanine and 14.5 parts of pivaloyl chloride are allowed to react according to the procedure described in Example 1. Upon completion of the reaction, the mixture is adjusted to pH 1, resulting in separation of the crude product as an oil. This oily material is dissolved in ether and the ether solution is washed with water, dried over anhydrous magnesium sulfate, then stripped of solvent under reduced pressure. The resulting residue crystallizes upon standing and is purified by recrystallization first from cyclohexane, then from cyclohexane-isopropyl alcohol to afford pure DL N-pivaloylphenylalanine, melting at 139–141.5°.

EXAMPLE 5

To a solution of 4.42 parts of DL N-propionylphenylalanine in 54 parts of tetrahydrofuran is added 2.02 parts of N-methylmorpholine and the resulting reaction mixture is cooled to a temperature between −15° and −20°. While that mixture is rapidly stirred and cooled, 2.28 parts of ethyl chloroformate is added dropwise. Cooling at −15 to −20° is continued while 3.99 parts of 4-methylbenzylamine is added. The reaction mixture is stirred over a period of about 2 hours while the temperature is allowed to rise to room temperature. Dilution of that reaction mixture with a large quantity of water results in precipitation of the crude product, which is separated by filtration, then dissolved in chloroform. The resulting organic solution is washed successively with dilute hydrochloric acid and dilute aqueous potassium bicarbonate, then dried over anhydrous magnesium sulfate. The solution is then concentrated to a small volume and the product is precipitated by the addition of cyclohexane. Recrystallization of that material from isopropyl alcohol affords DL N-propionylphenylalanine 4 - methylbenzylamide, melting at about 185–186° and represented by the following structural formula

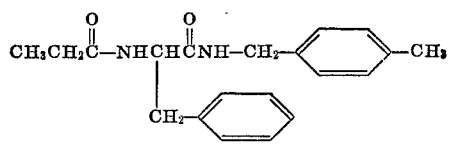

EXAMPLE 6

When equivalent quantities of L N-acetylphenylalanine and 4-methoxybenzylamine are substituted in the procedure of Example 5, there is obtained pure L N- acetyl-phenylalanine 4-methoxybenzylamide melting at about 161–163° and displaying an optical rotation in methanol of +10°. That compound is represented by the following structural formula

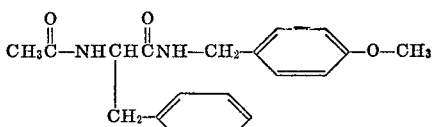

EXAMPLE 7

Substitution of equivalent quantities of L N-acetyl-p-methoxyphenylalanine and benzylamine in the procedure of Example 5 produces L N - acetyl-p-methoxyphenylalanine benzylamide melting at about 190–192°, displaying an optional rotation in methanol of about +4.5° and structurally represented by the following structural formula

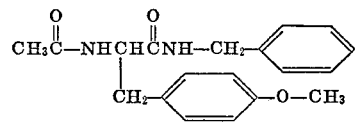

EXAMPLE 8

By substituting equivalent quantities of L p-methoxyphenylalanine and acetic anhydride in the procedure of Example 1 and otherwise following the procedure of Example 1, there is obtained L N-acetyl-p-methoxyphenylalanine.

EXAMPLE 9

Upon substitution of equivalent quantities of L N-acetyl - p - methoxyphenylalanine and 4-methoxybenzylamine in the procedure of Example 5, there is afforded L N - acetyl - p-methoxyphenylalanine 4-methoxybenzylamide, which compound melts at about 180–182° and displays an optical rotation in methanol of +4.5°. The structural formula representing this compound is shown below

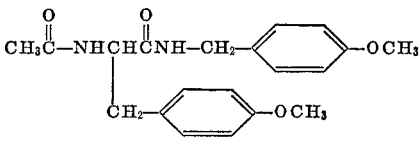

EXAMPLE 10

When there is substituted an equivalent quantity of benzylamine in the procedure of Example 5, there is afforded DL N-propionylphenylalanine benzylamide melting at about 170–171.5° and represented by the following structural formula

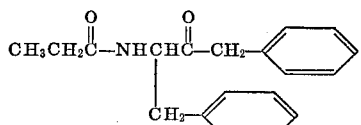

EXAMPLE 11

By substituting equivalent quantities of DL N-pivaloylphenylalanine and benzylamine and otherwise following the procedure of Example 5, there is obtained DL N-pivaloylphenylalanine benzylamide which melts at about 152–153.5°. That compound is structurally represented by the following formula

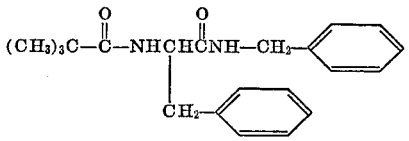

EXAMPLE 12

Treating an equivalent quantity of DL N-acetylphenylalanine according to the procedure detailed in Example 5 yields DL N-acetylphenylalanine 4-methylbenzylamide melting at about 188–189.5° and represented by the following structural formula

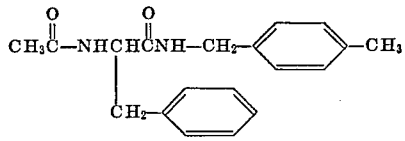

EXAMPLE 13

Substitution of equivalent quantities of DL N-acetylphenylalanine, trans-2-phenylcyclopropylamine, isobutyl chloroformate and methylene chloride and a reaction time at room temperature of about 16 hours in the procedure of Example 5 yields DL N-acetylphenylalanine trans-2-phenylcyclopropylamide. That material melts at 208–212° with decomposition and is represented by the following structural formula

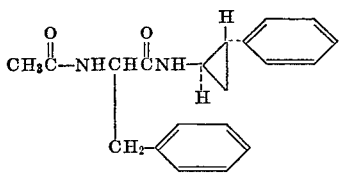

EXAMPLE 14

When equivalent quantities of D N-propionylphenylalanine and isobutyl chloroformate are substituted in the procedure of Example 5, there is produced D N-propionylphenylalanine 4-methylbenzylamide which melts at about 173.5–175°, displays an optical rotation in dimethylformamide of +8.9° and is represented by the following structural formula

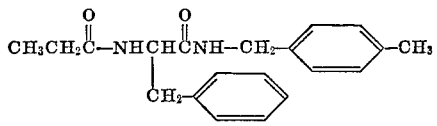

EXAMPLE 15

Treatment of equivalent quantities of DL N-acetyl phenylalanine and phenethylamine and isobutyl chloroformate according to the procedure of Example 5 affords DL N-acetylphenylalanine phenethylamide melting at about 160–162° and represented by the following structural formula

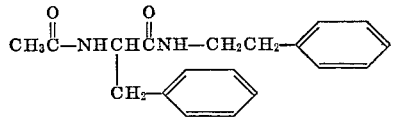

EXAMPLE 16

Substitution of equivalent quantities of DL N-butyrylphenylalanine and isobutyl chloroformate in the procedure of Example 5 affords DL N-butyrylphenylalanine 4-methylbenzylamide melting at about 168–169°. That compound is structurally represented by the formula below

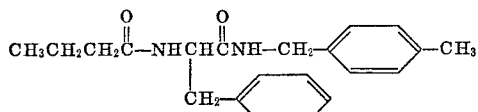

EXAMPLE 17

By substituting equivalent quantities of 2-methylbenzylamine and isobutyl chloroformate and otherwise following the procedure of Example 5, there is obtained DL N-propionylphenylalanine 2-methylbenzylamide. That compound melts at about 183–184° and is represented by the following structural formula

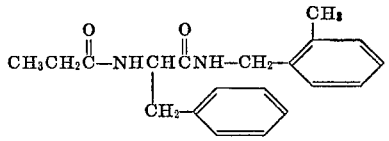

EXAMPLE 18

When equivalent quantities of 4-ethylbenzylamine and isobutyl chloroformate are substituted in the procedure of Example 5, DL N-propionylphenylalanine 4-ethylbenzylamide is produced. That compound melts at about 152–153° and is represented structurally by the formula below

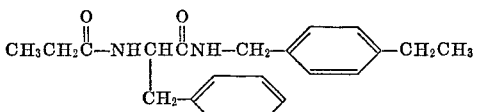

EXAMPLE 19

DL N-propionyl-p-fluorophenylalanine 4-methylbenzylamide is produced when equivalent quantities of DL N-propionyl-p-fluorophenylalanine and isobutyl chloroformate are substituted in the procedure of Example 5. That compound melts at about 195° and is represented by the following structural formula

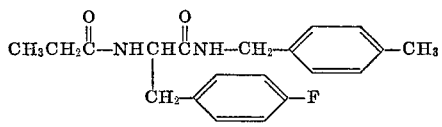

EXAMPLE 20

By substituting equivalent quantities of 4-isopropylbenzylamine and isobutyl chloroformate in the procedure of Example 5, DL N-propionylphenylalanine 4-isopropylbenzylamide, melting at about 128–129°, is produced. That compound is structurally represented by the following formula

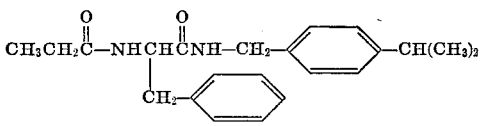

EXAMPLE 21

When equivalent quantities of 4-tert-butylbenzylamine and isobutyl chloroformate are substituted in the procedure of Example 5, there is obtained DL N-propionylphenylalanine 4-tert-butylbenzylamide which melts at about 137.5–138.5° and is represented by the following structural formula

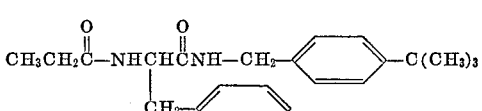

EXAMPLE 22

Substitution of equivalent quanties of DL N-pivaloylphenylalanine, 4-methylbenzylamine and isobutyl chloroformate in the procedure of Example 5 affords DL N-pivaloylphenylalanine 4-methylbenzylamide. That compound melts at about 210–212° and is represented by the following structural formula

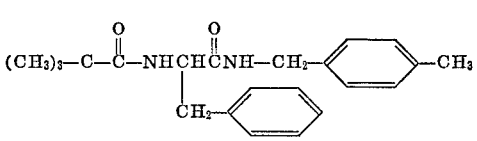

EXAMPLE 23

When equivalent quantities of DL N-propionyl-p-chlorophenylalanine and isobutyl chloroformate are substituted into the procedure of Example 5, there is obtained DL N-propionyl-p-chlorophenylalanine 4-methylbenzylamide, melting at about 199° and represented by the following structural formula

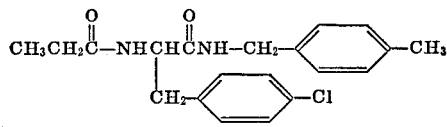

EXAMPLE 24

By substituting equivalent quantities of isobutyl chloroformate and 4-chlorobenzylamine and otherwise following the procedure of Example 5, there is produced DL N-propionylphenylalanine 4-chlorobenzylamide which melts at about 182° and is structurally represented by the formula below

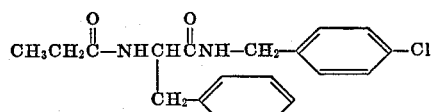

EXAMPLE 25

A solution of 20 parts of ethyl 4-cyanobenzoate dissolved in 133 parts of dry tetrahydrofuran is added dropwise to a stirred solution of 10 parts of lithium aluminum hydride in 266 parts of dry tetrahydrofuran. That solution is stirred for about 15 minutes and the excess lithium aluminum hydride is decomposed with water. Then about 50 parts by volume of a 50% potassium sodium tartrate solution is added to yield 4-hydroxymethylbenzylamine as a precipitate which is filtered, stripped of solvent and dissolved in tetrahydrofuran for use in the succeeding reaction.

EXAMPLE 26

To a solution of 16.1 parts of DL N-propionylphenylalanine in 138 parts of dry tetrahydrofuran, under a nitrogen atmosphere and cooled to −20°, is added 7.56 parts of N-methylmorpholine. The mixture is allowed to warm several degrees and then 10.44 parts of isobutyl chloroformate is added dropwise while maintaining the reaction temperature at about −10 to −15°. After the mixture is stirred for about 10 minutes and cooled again to about −20°, the 4-hydroxymethylbenzylamine-tetrahydrofuran solution prepared in Example 25 is added dropwise and then the mixture is stirred for 30 minutes. That mixture is washed with water and extracted with ethyl acetate. The ethyl acetate extract is washed with 1 N hydrochloric acid and washed with a 1% sodium bicarbonate solution. The organic layer is separated, dried over anhydrous sodium sulfate, filtered and stripped of solvent to yield a gelatinous solid. Then that material is crystallized from isopropanol by the addition of water accompanied by cooling in an ice bath to obtain crude product which, after washing with benzene, yields pure DL N-propionylphenylalanine 4-hydroxymethylbenzylamide melting at about 166–168° and represented by the following structural formula

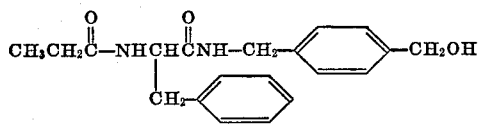

EXAMPLE 27

To a cold solution of 18.1 parts of DL N-propionylphenylalanine and 17.7 parts of 2,4,5-trichlorophenol in 200 parts by volume of a 3:1 ethyl acetatetetrahydrofuran solution is added 18.5 parts of dicyclohexylcarbodiimide in 45 parts of cold ethyl acetate. That solution is stirred for 3 hours and allowed to warm to room temperature, after which time the precipitate which forms is filtered and washed with acetone. The filtrate is stripped to a solid and then triturated with n-hexane and washed with n-hexane. Pure DL 2,4,5-trichlorophenyl N-propionylphenylalaninate is obtained upon crystallization from ethanol and melts at about 132–133.5°.

EXAMPLE 28

A suspension of 1.51 parts of 4-carboxybenzylamine in 23.8 parts of N,N-dimethylformamide is brought into solution by the addition of 1.62 parts by volume of a 6.17 N hydrochloric acid in dioxane solution. To that solution is added 4.41 parts of DL 2,4,5-trichlorophenyl N-propionylphenylalaninate and then 2.1 parts of N-methylmorpholine. Precipitate formation is immediate and the mixture is stirred at room temperature for about 2½ hours. After that time the excess DL 2,4,5-trichlorophenyl N-propionylphenylalaninate is destroyed by the addition of 0.319 part of 2-dimethylaminoethylamine and the reaction mixture is stirred for 1 hour at room temperature. That mixture is added to 250 parts by volume of a cold 1 N hydrochloric acid solution and filtered. The precipitate which is collected is washed with water, dried at about 65° in a steam oven and boiled in isopropanol. The isopropanol mixture is diluted with n-hexane and filtered to yield, after drying under reduced pressure, pure DL N-propionylphenylalanine 4-carboxybenzylamide. That compound melts at about 242.5–243.5° and is represented by the following structural formula

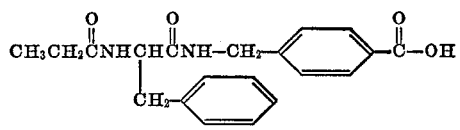

To a stirred mixture of 123.9 parts of DL phenylalanine in 1125 parts of water is added 50% aqueous sodium hydroxide to adjust the pH to about 11–11.5. The mixture is cooled in an ice bath to maintain the temperature at about 20°, and 140.8 parts of carbobenzoxy chloride is added dropwise while the pH is maintained at about 11–11.5 by the periodic addition of 50% aqueous sodium hydroxide. The mixture is stirred for 1 hour and then washed with ether. The pH of the aqueous layer is adjusted to about 1–2 by the addition of concentrated hydrochloric acid. The mixture then is extracted with ethyl acetate and the extracts acidified and washed with water until neutral. Those extracts are dried over anhydrous sodium sulfate and stripped of solvent under reduced pressure to yield an oil which is shaken with cyclohexane. Upon standing, pure DL N-carbobenzoxyphenylalanine, melting at about 94–97°, crystallizes from the cyclohexane.

EXAMPLE 30

Substitution of equivalent quantities of DL N-carbobenzoxyphenylalanine and isobutyl chloroformate in the procedure of Example 5 yields DL N-carbobenzoxyphenylalanine 4-methylbenzylamide which melts at about 155–156.5°.

EXAMPLE 31

A mixture containing 223.5 parts of DL N-carbobenzoxyphenylalanine 4-methylbenzylamide, 2400 parts by volume of 90% acetic acid and 22.3 parts of palladium black is hydrogenated for about 2 hours under about 60 p.s.i. hydrogen pressure at room temperature and then filtered. The filtrate is stripped of solvent and the solid material remaining is washed with water and dried under reduced pressure to afford DL phenylalanine 4-methylbenzylamide tetartoacetate melting at about 82–84°.

EXAMPLE 32

To a stirred solution of 11.33 parts of DL phenylalanine 4-methylbenzylamide tetartoacetate and 73.6 parts of pyridine is added dropwise, 8.06 parts of acetoxyacetyl chloride. After the addition is complete, the solution is stirred for 15 minutes, then cooled to about 5° and added dropwise to 350 parts of cold water. The white precipitate which forms is collected by filtration, washed with water and dried. That material is recrystallized from isopropyl alcohol and then chromatographed on silcon dioxide to yield, upon elution with 1% methanol/chloroform, DL N-acetoxyacetylphenylalanine 4-methylbenzylamide. Pure material, melting at about 164.5–165.5°, is obtained after recrystallization from isopropanol.

EXAMPLE 33

A solution of 1.70 parts of DL N-acetoxyacetylphenylalanine 4-methylbenzylamide in 30 parts by volume of a 2:1 methanol/dioxane mixture is treated with 1.2 parts by volume of 4 N lithium hydroxide. That mixture is stirred at room temperature for 15 minutes. Solvent is removed under reduced pressure at about 40° and the white solid which forms is triturated with water, filtered washed with water and dried. Pure DL N-hydroxyacetylphenylalanine 4-methylbenzylamide, melting at about 148–150°, is obtained after recrystallization from isopropanol.

EXAMPLE 34

When equivalent quantities of DL N-propionyl-p-ethoxyphenylalanine and 4-ethoxybenzylamine are substituted in the procedure of Example 5, there is obtained DL N-propionyl-p-ethoxyphenylalanine 4-ethoxybenzylamide.

What is claimed is:
1. A compound of the formula

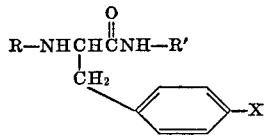

wherein R is a lower alkanoyl radical, R' is a trans-2-phenylcyclopropyl radical or a radical of the formula

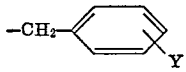

wherein Y is hydrogen or a lower alkoxy, hydroxymethyl, carboxy or lower alkyl radical and X is hydrogen or a halogen or lower alkoxy radical with the provision that when Y is hydrogen, X is a halogen or lower alkoxy radical.

2. As in claim 1, a compound of the formula

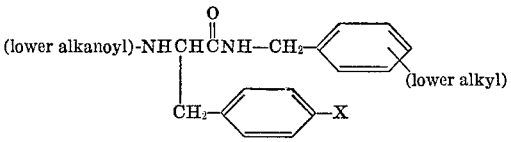

wherein X is selected from the group consisting of hydrogen, halogen and lower alkoxy radicals.

3. As in claim 1, a compound of the formula

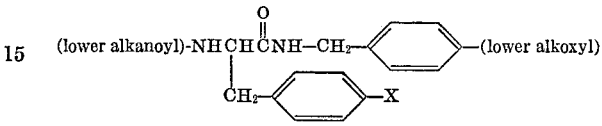

wherein X is selected from the group consisting of hydrogen, halogen and lower alkoxy radicals.

4. As in claim 1, a compound of the formula

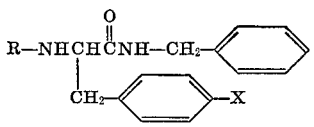

wherein R is a lower alkanoyl radical and X is a halogen or lower alkoxy radical.

5. As in claim 1, the compound which is DL N-propionylphenylalanine 4-methylbenzylamide.

6. As in claim 1, the compound which is DL N-acetylphenylalanine 4-methylbenzylamide.

7. As in claim 1, the compound which is DL N-propionylphenylalanine 4-ethylbenzylamide.

8. As in claim 1, the compound which is DL N-propionylphenylalanine 4-isopropylbenzylamide.

References Cited

R. Cornish-Bowden et al., Biochem. J., vol. 113, pp. 369–75 (1969).

S. Kerr et al., JACS, vol. 23, pp. 304–05 (1958).

HARRY I. MOATZ, Primary Examiner

U.S. Cl. X.R.

260—490, 518 R, 518 A, 559 A; 424—311, 317, 324